(12) United States Patent
Figueroa et al.

(10) Patent No.: US 10,769,029 B2
(45) Date of Patent: Sep. 8, 2020

(54) ACCESSING RECORDS OF A BACKUP FILE IN A NETWORK STORAGE

(71) Applicant: INTERNATIONAL BUSINESS MACHINES CORPORATION, Armonk, NY (US)

(72) Inventors: Ernesto E. Figueroa, Sahuarita, AZ (US); Robert S. Gensler, Jr., Beavercreek, OH (US); Jeffrey R. Suarez, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 309 days.

(21) Appl. No.: 15/356,147

(22) Filed: Nov. 18, 2016

(65) Prior Publication Data

US 2018/0143990 A1    May 24, 2018

(51) Int. Cl.
*G06F 17/30* (2006.01)
*G06F 11/14* (2006.01)

(52) U.S. Cl.
CPC ...... *G06F 11/1464* (2013.01); *G06F 11/1466* (2013.01); *G06F 11/1469* (2013.01); *G06F 2201/825* (2013.01)

(58) Field of Classification Search
CPC ......... G06F 17/30115; G06F 17/30171; G06F 11/1448; G06F 2201/825; G06F 2201/805; G06F 2201/82; G06F 11/1464; G06F 11/1469; G06F 11/1466
USPC ......... 707/E17.007, 638, 690, 704, 695, 640
See application file for complete search history.

(56) References Cited

U.S. PATENT DOCUMENTS

| 5,671,350 | A  | * | 9/1997 | Wood | G06F 11/1456 714/15 |
| 6,721,902 | B1 | * | 4/2004 | Cochran | G06F 11/1456 714/13 |
| 7,552,358 | B1 | * | 6/2009 | Asgar-Deen | G06F 11/1435 714/15 |
| 8,650,159 | B1 | * | 2/2014 | Zhang | G06F 11/1448 707/664 |

(Continued)

OTHER PUBLICATIONS

U.S. Appl. No. 15/015,598, filed Feb. 4, 2016.

(Continued)

*Primary Examiner* — Shiow-Jy Fan
(74) *Attorney, Agent, or Firm* — David W. Victor; Konrad Raynes Davda & Victor LLP

(57) ABSTRACT

Provided are a computer program product, system, and method for accessing records of a backup file in a network storage. A backup file comprises a sequential file of metadata records and data set records is processed. The metadata records include metadata on data of data sets in the data set records. Backup objects store the metadata and the data set records in the backup file. A determination is made of at least one container in the network storage to store the backup objects. Backup object information indicates for each of the backup objects, an order of the metadata or data set record, stored in the backup object, in the backup file, and a container of the at least one container in which the backup object is stored. Multiple of the backup objects are concurrently transmitted to the network storage to concurrently write to the at least one container.

22 Claims, 9 Drawing Sheets

(56) References Cited

U.S. PATENT DOCUMENTS

| | | | |
|---|---|---|---|
| 8,769,224 B1* | 7/2014 | Raj | G06F 11/1453 |
| | | | 711/154 |
| 10,432,724 B2 | 10/2019 | Figueroa et al. | |
| 2003/0037061 A1* | 2/2003 | Sastri | G06F 3/0601 |
| 2004/0133540 A1* | 7/2004 | Saake | G06F 17/30073 |
| 2004/0255048 A1* | 12/2004 | Lev Ran | G06F 9/546 |
| | | | 709/249 |
| 2007/0250674 A1* | 10/2007 | Fineberg | G06F 11/1451 |
| | | | 711/162 |
| 2008/0301141 A1 | 12/2008 | Banjou | |
| 2010/0100587 A1* | 4/2010 | Teglovic | G06F 11/1464 |
| | | | 709/203 |
| 2011/0029739 A1* | 2/2011 | Nakajima | G06F 3/0605 |
| | | | 711/154 |
| 2011/0252071 A1* | 10/2011 | Cidon | G06F 17/30174 |
| | | | 707/802 |
| 2012/0017037 A1* | 1/2012 | Riddle | G06F 17/30519 |
| | | | 711/103 |
| 2013/0110784 A1* | 5/2013 | Guo | G06F 11/1448 |
| | | | 707/649 |
| 2013/0185258 A1 | 7/2013 | Bestler et al. | |
| 2014/0181034 A1* | 6/2014 | Harrison | G06F 17/3007 |
| | | | 707/646 |
| 2014/0181040 A1* | 6/2014 | Montulli | G06F 11/1451 |
| | | | 707/652 |
| 2014/0181051 A1* | 6/2014 | Montulli | G06F 17/30129 |
| | | | 707/679 |
| 2014/0181579 A1* | 6/2014 | Whitehead | G06F 17/30289 |
| | | | 714/15 |
| 2015/0269032 A1* | 9/2015 | Muthyala | G06F 11/1464 |
| | | | 707/639 |
| 2016/0004718 A1 | 1/2016 | Lin et al. | |
| 2016/0154817 A1 | 6/2016 | Mason, Jr. et al. | |
| 2016/0210308 A1* | 7/2016 | Shekhar | G06F 17/30174 |
| 2016/0239388 A1* | 8/2016 | Joseph | G06F 11/1464 |
| 2016/0364158 A1* | 12/2016 | Narayanan | G06F 3/0619 |
| 2017/0123935 A1 | 5/2017 | Pandit et al. | |
| 2017/0228293 A1 | 8/2017 | Figueroa et al. | |
| 2017/0277602 A1* | 9/2017 | Kumar | G06F 11/1469 |
| 2018/0089110 A1 | 3/2018 | Zhou et al. | |
| 2018/0146037 A1 | 5/2018 | Figueroa et al. | |
| 2019/0215367 A1 | 7/2019 | Figueroa et al. | |

OTHER PUBLICATIONS

"DFSMSdss Storage Administration", IBM Corporation, Version 2 Release 1, Document SC23-6868-01, 2014, pp. 710.

"Tar—Format of tar archives", IBM Corporation, [online][retrieved Nov. 5, 2016] https://www.ibm.com/support/knowledgecenter/SSLTBW_2.2.0/com.ib . . . , pp. 3.

"Tar (computing)", Wikipedia, [online][retrieved Nov. 5, 2016] https://en.wikipedia.org/wiki/Tar_(computing), pp. 9.

"The TAR File Format", FileFormat.Info, [online][retrieved Nov. 5, 2016] http://www.fileformat.info/format/tar/corion.htm, pp. 8.

"XML API Overview—Cloud Storage Documentation", Google.Com, [online][retrieved Nov. 5, 2016] https://cloud.google.com/storage/docs/xml-api/overview, pp. 7.

"Multi-Cloud Storage Toolkit", IBM Corporation, [online][retrieved Nov. 5, 2016] https://www.zurich.ibm.com/csc/security/toolkit/, pp. 2.

U.S. Appl. No. 15/356,073, filed Nov. 18, 2016.

"DFSMSdss Storage Administration", IBM Corporation, Version 2 Release 1, Document SC23-6868-01, 2014, Chapter 6. Managing availability with DFSMSdss, pp. 37-42; Chapter 13. Format of the DFSMSdss dump data set, pp. 195-214.

List of Patents or Patent Applications Treated as Related, dated Nov. 18, 2016, pp. 2.

Notice of Allowance dated Jan. 8, 2019, pp. 21, for U.S. Appl. No. 15/356,073.

U.S. Appl. No. 16/352,817, filed Mar. 13, 2019.

List of IBM Patents or Patent Applications Treated as Related, dated May 24, 2019, pp. 2.

Amendment dated Mar. 28, 2019, pp. 9, for U.S. Appl. No. 15/356,073.

Notice of Allowance dated May 15, 2019, pp. 13, for U.S. Appl. No. 15/356,073.

Office Action1 for dated Aug. 15, 2019, pp. 19, for U.S. Appl. No. 16/352,817.

Response dated Nov. 4, 2019, pp. 8, to Office Action1 for dated Aug. 15, 2019, pp. 19, for U.S. Appl. No. 16/352,817.

Notice of Allowance dated Nov. 20, 2019, pp. 12, for U.S. Appl. No. 16/352,817.

* cited by examiner

ACCESSING RECORDS OF A BACKUP FILE IN A NETWORK STORAGE

BACKGROUND OF THE INVENTION

1. Field of the Invention

The present invention relates to a computer program product, system, and method for accessing records of a backup file in a network storage.

2. Description of the Related Art

Cloud storage service providers provide access to network based storage to allow subscribers to backup and access data objects in containers and locations in the network storages over a network, such as the Internet. When an object is stored in the cloud, multiple copies of an object may be created. Cloud storage service providers may partition the cloud storage so that subscribers are limited to accessing those partitions or containers of storage to which they are assigned.

Client systems may use Hypertext Transport Protocol (HTTP) type commands to access data objects stored in cloud storage, such as GET and PUT requests.

There is a need in the art for improved techniques for providing access to data in backup files in a network storage accessible to multiple client systems, such as cloud storage services.

SUMMARY

Provided are a computer program product, system, and method for accessing records of a backup file in a network storage. A backup file comprises a sequential file of metadata records and data set records is processed. The metadata records include metadata on data of data sets in the data set records. Backup objects are generated to store the metadata and the data set records in the backup file. A determination is made of at least one container in the network storage to store the backup objects. Backup object information is generated indicating, for each of the backup objects, an order of the metadata or data set record, stored in the backup object, in the backup file, and a container of the at least one container in which the backup object is stored. Multiple of the backup objects are concurrently transmitted to the network storage over a network to concurrently write to the at least one container indicated for the backup objects in the backup object information.

DETAILED DESCRIPTION

Described embodiments provide techniques to generate backup objects to store metadata and data set records in a backup file to transfer to network storage at a cloud storage service in a manner that reduces network delays by allowing for the concurrent writing of multiple of the backup objects to containers in the network storage. Further, multiple backup objects of the backup file can be concurrently read from the network storage to reassemble the backup file in a manner that in parallel restores multiple backup objects to reduce network latency.

Figure 1:
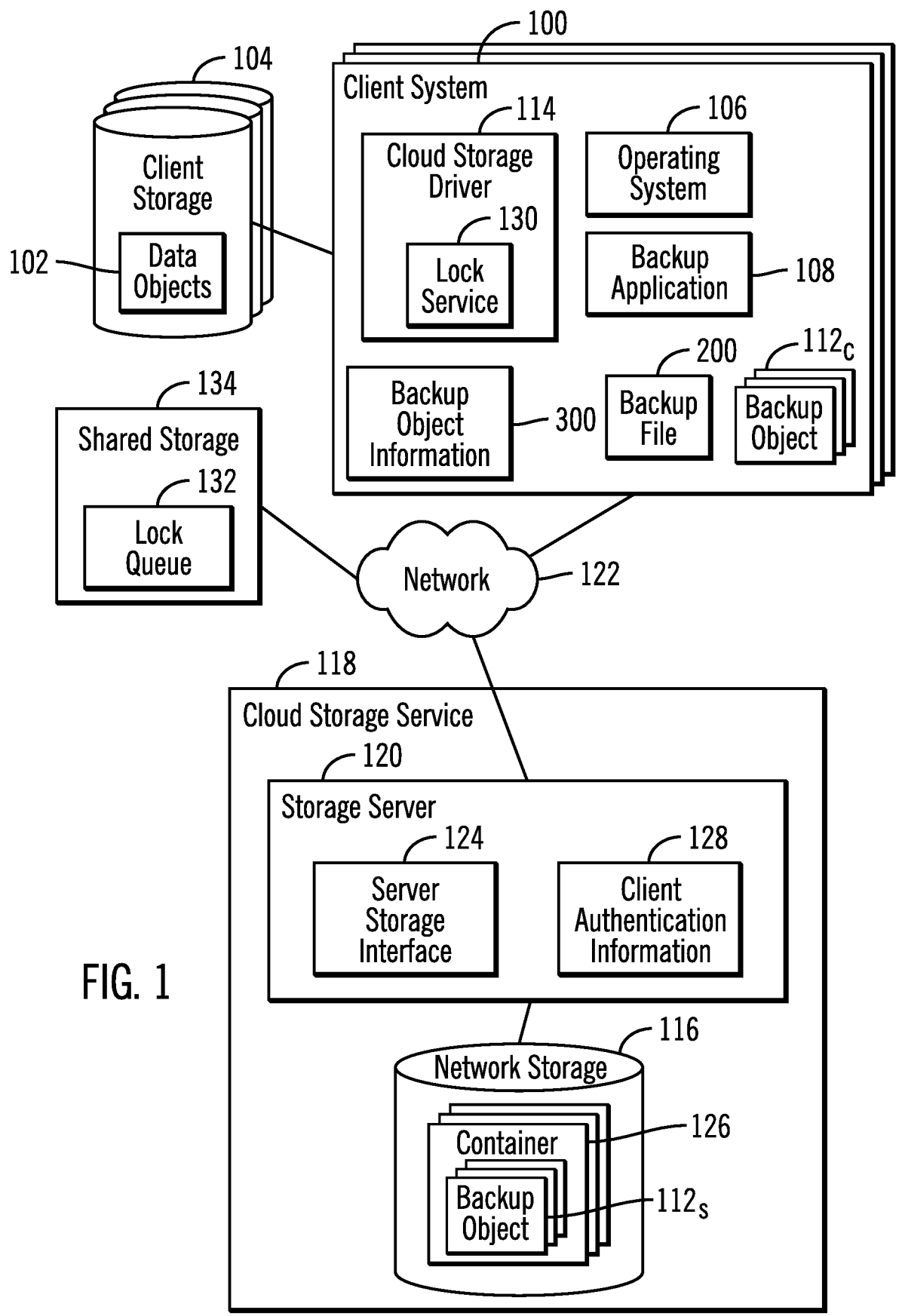
FIG. 1 illustrates an embodiment of a network storage environment.

FIG. 1 illustrates an embodiment of a network storage environment comprising client systems 100, also referred to as a client system and client, that may store data sets 102 in a client storage 104. The client system 100 includes an operating system 106, which manages computer hardware and software resources and provides common services and a file system for the storage 104, and a backup application 108 to generate a backup file 200 having one or more of the data sets 102 and metadata on the data sets in metadata and data set records. The backup application 108 generates backup objects 112$_C$ from the metadata and data set records in the backup file 200. The backup application 108 may invoke a cloud storage driver 114, which may be supplied by the cloud storage service provider, to read and write the backup objects 112 to a network storage 116 managed by a cloud storage service 118 maintained by the cloud storage provider.

The cloud storage service 118 maintains a storage server 120 that manages access to the network storage 116 over a network 122. The cloud storage service 118 provides cloud storage services to allow participating clients that subscribe to the storage services offered by the cloud storage service 118 to store and archive backup objects 112 comprising backup files 200 over the network 122 at the network storage 116.

The storage server 120 may include a server storage interface 124 to process access requests with respect to received backup objects 112$_S$ to store in containers 126 configured in the network storage 116 for subscribers to the cloud storage service 118. The backup application 108 generates backup object information 300 providing information on backup objects 112$_C$ and containers 126 in the network storage 116 storing the backup objects 112$_C$. The backup objects 112$_S$ in the containers 126 may comprise the backup objects 112$_C$ generated by the backup application 108 in one or more client systems 100. The storage server 120 maintains client authentication information 128 to determine whether the client systems 100 and/or backup applications 108 requesting access to containers 126 in the network storage 116 are subscribers authorized to access specified containers 126 and requested backup objects 112$_S$. Each client system 100 may interface with multiple different cloud storage services 118 offered by different cloud storage service providers, such as DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The cloud storage driver 114 may maintain a lock service 130 to manage locks to the backup objects $112_S$ to serialize access to the backup objects $112_S$. The lock service 130 in multiple clients 100 may access a lock queue 132 having lock entries that indicate backup objects $112_S$ being accessed by the backup applications 108.

The lock queue 132 may be maintained in a shared storage 134. The shared storage 134 may comprise a network or other storage accessible to the client systems 100 over the network 122. In alternative embodiments, the shared storage 134 may be implemented in a client storage 104 that is accessible to multiple of the client systems 100. Alternatively, the lock queue 132 may be maintained in the container 126 on the network storage 116, and accessible to those clients 100 authorized to access the data objects in the container 126.

In one embodiment, the cloud storage driver 114 may transmit to the storage server interface 124 PUT commands to transmit client backup objects $112_C$ to a storage server interface 124 and GET commands to retrieve backup objects $112_S$ in the network storage 116. In one embodiment, the PUT and GET commands may be part of a network protocol, such as the Hypertext Transport Protocol (HTTP). Further, the transmitting of the backup objects $112_C$ from the client system 100 to the storage server 120 with the PUT and GET commands may be transferred using a block level storage transfer. In additional embodiments, different commands and protocols may be used for the transfer.

The client storage 104, shared storage 134, and the network storage 116 may be comprised of one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices in one storage tier maybe organized as a Redundant Array of Independent Disks (RAID) array, a Just of Bunch of Disks (JBOD) array, and other arrangements.

The network 122 may comprise a network such as a Storage Area Network (SAN), Local Area Network (LAN), Intranet, the Internet, Wide Area Network (WAN), peer-to-peer network, wireless network, arbitrated loop network, etc. In one embodiment, the storage server 120 may implement a cloud computing environment in the network 122 that provides storage services to clients 100 that subscribe to the cloud storage service.

Although a certain number of instances of elements, such as clients 100, storage servers 120, and storages 104 and 116, etc., are shown, there may be any number of these elements.

Figure 2:
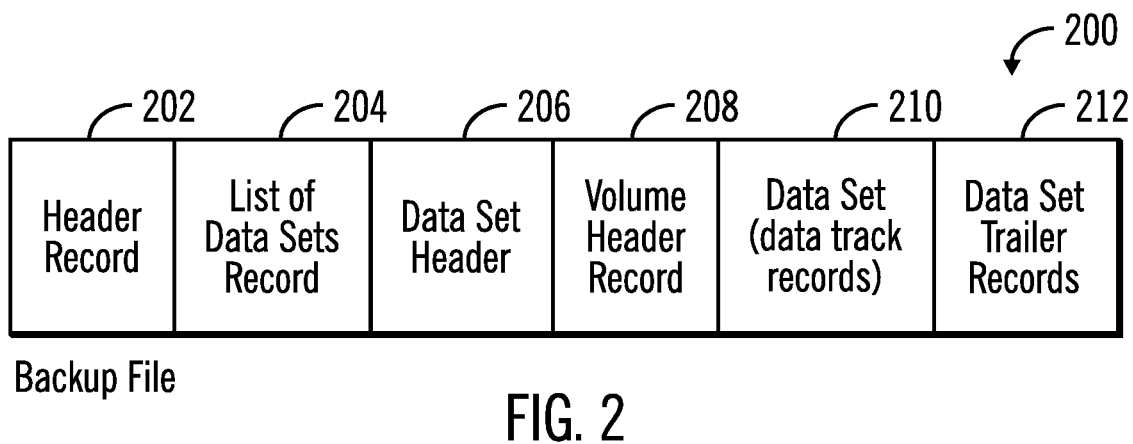
FIG. 2 illustrates an embodiment of a backup file.

FIG. 2 illustrates an embodiment of the metadata and data set records that may be included in a backup file 200, including a header record 202 providing information on the backup, such as whether the data is encrypted and other formatting of the data; a list of data sets record 204 indicating data sets included in the backup file 200, where each data set may be comprised of ranges of tracks or other storage units; a data set header record 206 providing information on a following data set 210; a volume header record 208 providing information on a volume included in the immediately following data set in the backup file 200, including information on an operation that created the backup file 200; a data set (data track records) 210 of tracks in the volume identified by the immediately preceding volume header 208); and data set trailer records 212 signaling an end of the immediately preceding data set 210. For each data set in the backup file 200, an additional instance of the information in records 206, 208, 210, and 212 are provided, and, for each volume within a data set, an instance of the information in records 208 and 210 are provided. In FIG. 2, the records 202, 204, 206, 208, and 212 comprise metadata records and the data sets 210 of tracks comprise the data set records.

In certain embodiments, the backup file 200 comprises a sequential file where the metadata and data records are written sequential. The backup file 200 may be in other data formats than sequential.

The metadata and data set records of FIG. 2 are by way of example and there may be different or additional metadata and data set records included in the backup file 200. Further, the backup file 200 may conform to different backup file formats known in the art, including, but not limited to, ADRTAPB data area format or a TAR format. Other backup file formats may be used.

In an alternative embodiments, the backup objects for the metadata records comprise inventory objects having information on attributes of data sets in data set objects, where the inventory objects may have information on data set objects in information having information used to validate restored data set objects to ensure they have not changed since backed-up in the network storage to validate data integrity of the stored backed-up data set objects.

Figure 3:
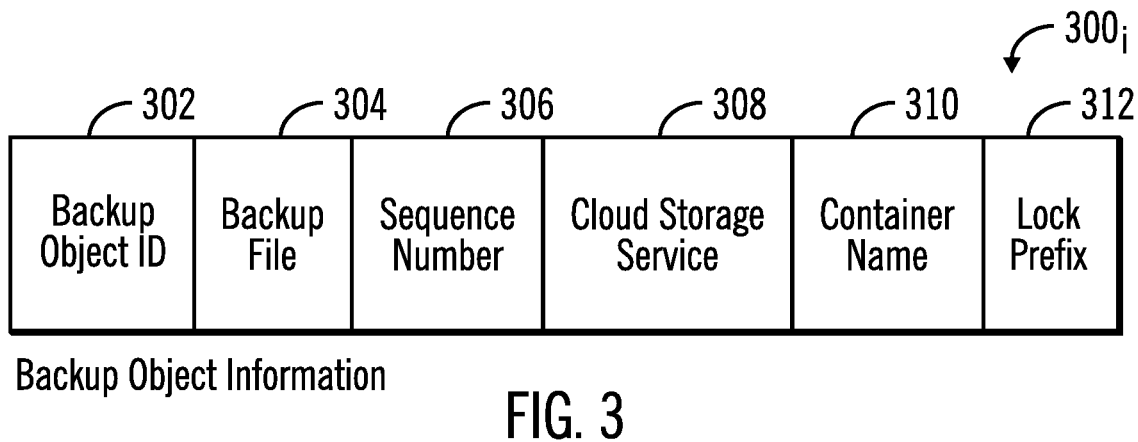
FIG. 3 illustrates an embodiment of backup object information.

FIG. 3 illustrates an embodiment of an instance of backup object information $300_i$ in the backup object information 300 for a backup object $112_C$, including a backup object identifier (ID) 302; a backup file 304 comprising an identifier of the backup file 200 for which the backup object 302 is generated; a sequence number 306 indicating an order in the backup file 304 of the metadata or data record stored in the backup object 302; a cloud storage service 308 identifying the cloud storage service 118, where there may be multiple cloud storage services 118, at which the backup object 302 is stored; a container name 310 of the container 126 in the network storage 116 offered by the cloud storage service 308; and a lock prefix 312 used to uniquely identify the backup object 302 in the lock queue 132 to serialize access to the backup object 302.

The information in the backup object information 300 may be contained in a single data structure as shown in FIG. 3 or be dispersed through different records in different data structures, tables, objects, etc.

In one embodiment, multiple backup objects $112_S$ may be stored in one container 126, where the unique lock prefixes 312 would allow current reads and writes to the backup objects $112_S$ in one container 126. Alternatively, there may be only one backup object $112_S$ stored in a container 126. The container name may include identifying information of the backup file 200 and metadata and data set records stored in the backup objects $112_S$. Alternatively, the container name 310 may include a user selected name or name unrelated to the backup file 200 and backup object names. In one embodiment, a lock prefix 312 name may indicate the backup object and a unique code, such as a timestamp, at which the backup object was generated, to uniquely identify the backup object. Alternatively, the lock prefix may be uniquely selected or generated for the backup object that the lock prefix serializes.

By providing a different lock prefix 312 name for each backup object $112_S$, access requests may be serialized on the backup object $112_S$, allowing current accesses to different backup objects of one backup file 200 in one container 126 to reduce network latency at which objects in a sequential backup file 200 are transferred. This reduces the delays in network and cloud retrieval that typically reduces the usefulness of cloud storage.

The backup objects $112_C$ generated for a backup file 200 may be stored in containers 126 at one cloud storage service 118 or multiple cloud storage services.

Figure 4:
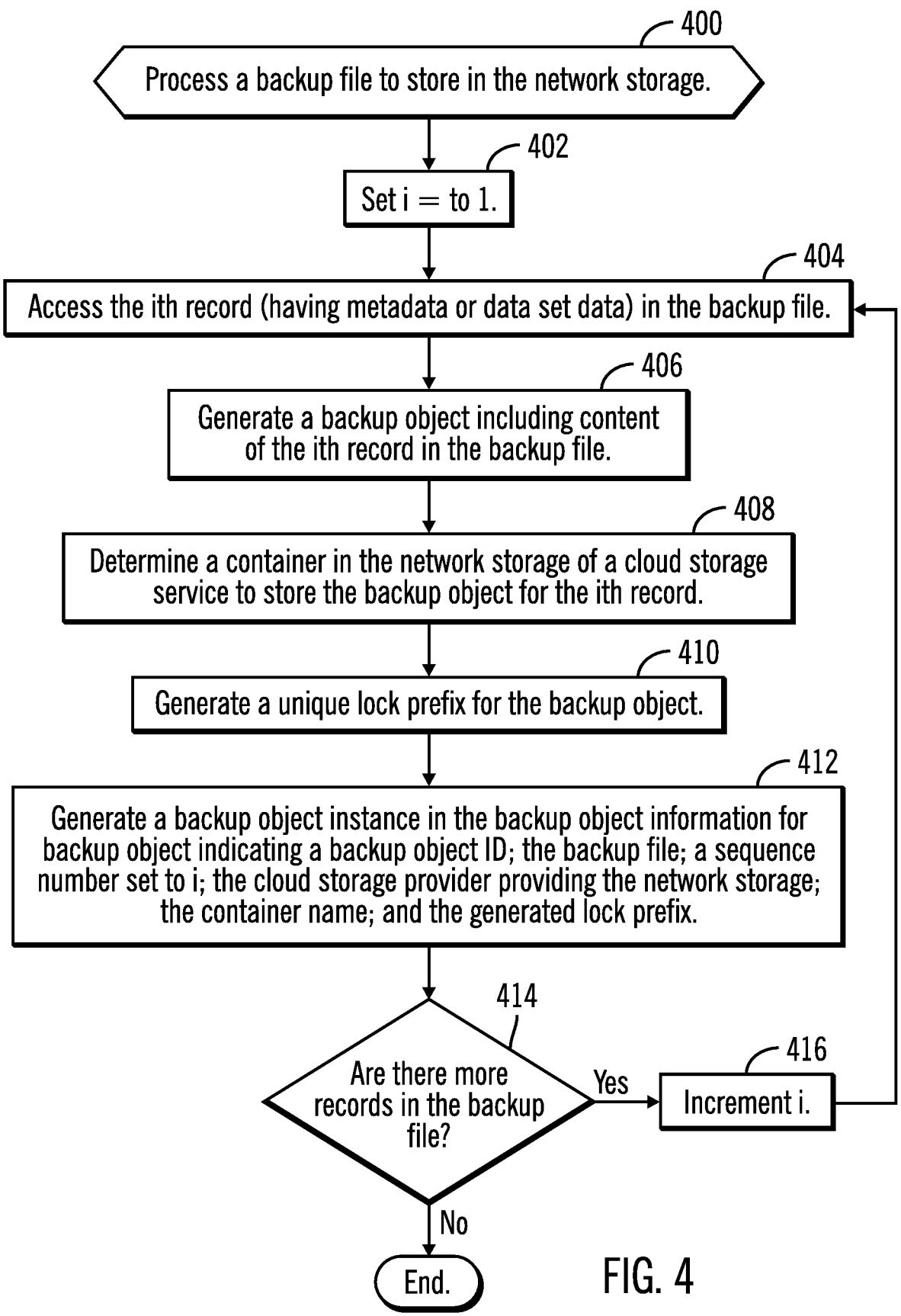
FIG. 4 illustrates an embodiment of operations to process a backup file to generate backup objects.

FIG. 4 illustrates an embodiment of operations performed by the backup application 108 and cloud storage driver 114 to process a backup file 200 to store in the network storage 116. The backup application 108 may have created the backup file 200 by processing data sets 102 to generate a backup file 200 having selected data sets 102 and metadata on the data sets in records in the backup file 200, such as shown with respect to FIG. 2. Upon processing (at block 400) the backup file 200 to transfer to the network storage 116, the backup application 108 sets (at block 402) a variable i to 1. The ith record, having metadata or data set data, in the backup file 200, e.g., records 202-212, is accessed (at block 404). A backup object $112_i$ is generated (at block 406) including the content of the ith record in the backup file 200. A determination is made (at block 408) of a container 126 in the network storage 116 of a cloud storage service 118 to store the ith backup object $112_i$. Backup objects $112_C$ for a backup file 200 may be stored in containers 126 at different cloud storage services 118 or within containers of a same cloud storage service 118. The determination operation at block 408 may involve creating a container 126 for one or more backup objects $112_C$ to store. A unique lock prefix 312 for the backup object $112_i$ is generated (at block 410). A backup object information instance $300_i$ is generated (at block 412) in the backup object information 300 for the generated backup object $112_i$ indicating a backup object ID 302, the backup file 304, a sequence number 306 set to i; the cloud storage provider 308 providing the network storage 116; the container name 310; and the generated lock prefix 312.

If (at block 414) there are more metadata or data set records in the backup file 304 to process, then i is incremented (at block 416) and control returns to block 404 to generate a next backup object for the next record in the backup file 200. If (at block 414) there are no further records in the backup file 200 to process, then control ends.

If a metadata record is comprised of a plurality of sub-metadata records, then a backup object may be generated for each sub-metadata record for storage in the network container 126.

Figure 5:
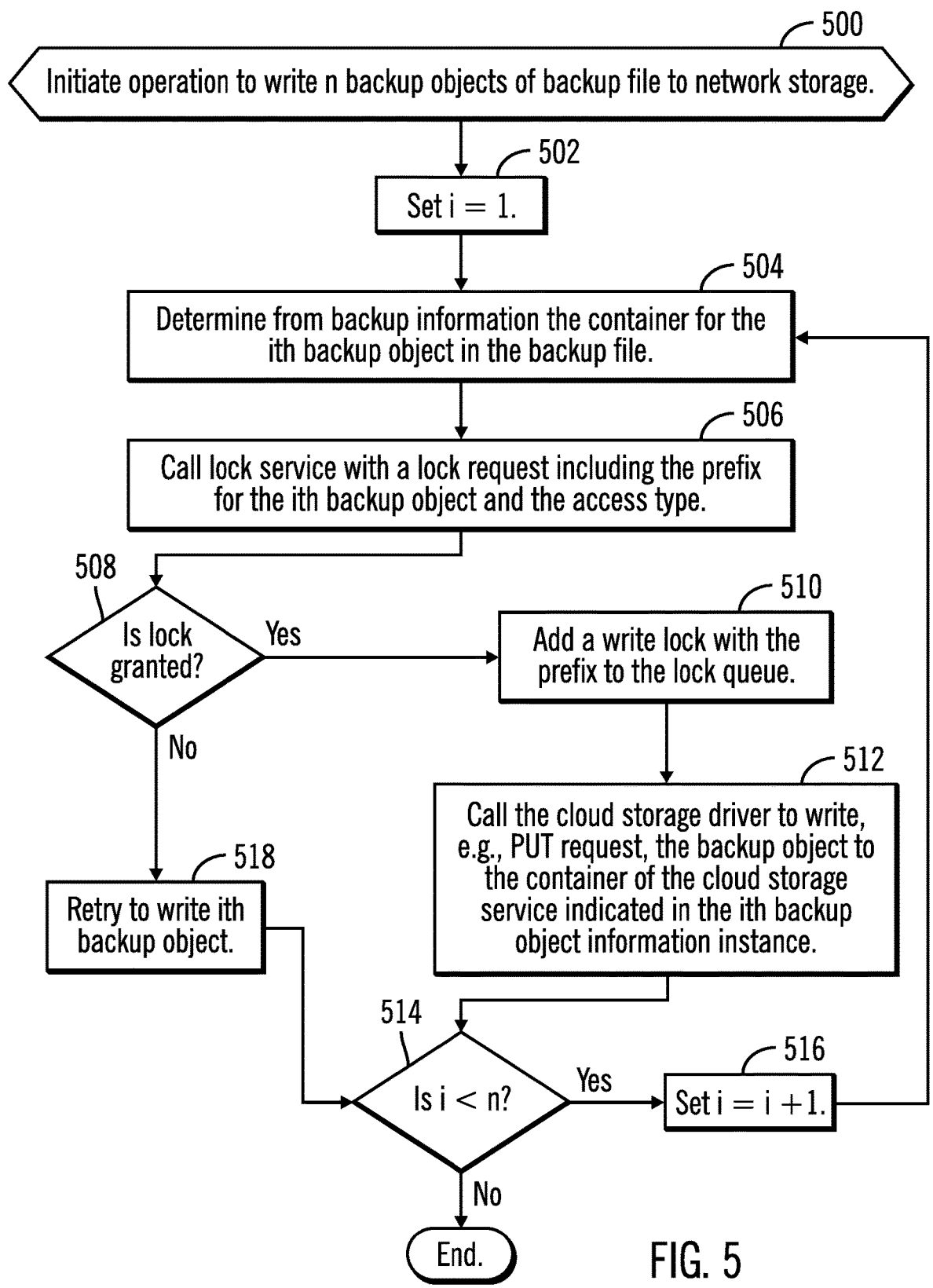
FIG. 5 illustrates an embodiment of operations to write backup objects to a network storage.

FIG. 5 illustrates an embodiment of operations performed by the backup application 108 and cloud storage driver 114 to write n backup object of a backup file 200 to the network storage 116. Upon initiating (at block 500) operations to concurrently write the backup objects to the network storage 116, the variable i is set (at block 502) to one. A determination is made (at block 504) from the backup object information instance $300_i$ for the ith backup object, the container 310 for the ith backup object $112_i$. The lock service 130 is called (at block 506) with a write lock request including the lock prefix 312 for the backup object information $300_i$. If the lock is granted (at block 508), which occurs if the lock queue 132 does not include another read or write lock for the prefix 312, then a write lock with the prefix 312 is added (at block 510) to the lock queue 132. The backup application 108 calls (at block 512) the cloud storage driver 114 to write (e.g., a PUT request) the backup object $112_i$ to the container 310 of the cloud storage service 308 indicated in the backup object information $300_i$. The cloud storage driver 114 transfers the write request to the server storage interface 124 to write. If (at block 514) all the backup objects have not been written, which occurs when i<n, then i is incremented (at block 516) and control proceeds back to block 504 to process the next backup object $112_{i+1}$ to write.

If (at block 508) the lock is not granted, then the write of the ith backup object $112_i$ may be retried (at block 518) or queued to retry, and control proceeds to block 514 to write the next backup object $112_{i+1}$ for the backup file 200.

With the operations of FIG. 5, the backup objects $112_C$ generated for the metadata and data set records of a backup file may be concurrently transmitted over the network 122 to the network storage 116 to write in parallel to the containers 126 to reduce network transmission delays.

Figure 6:
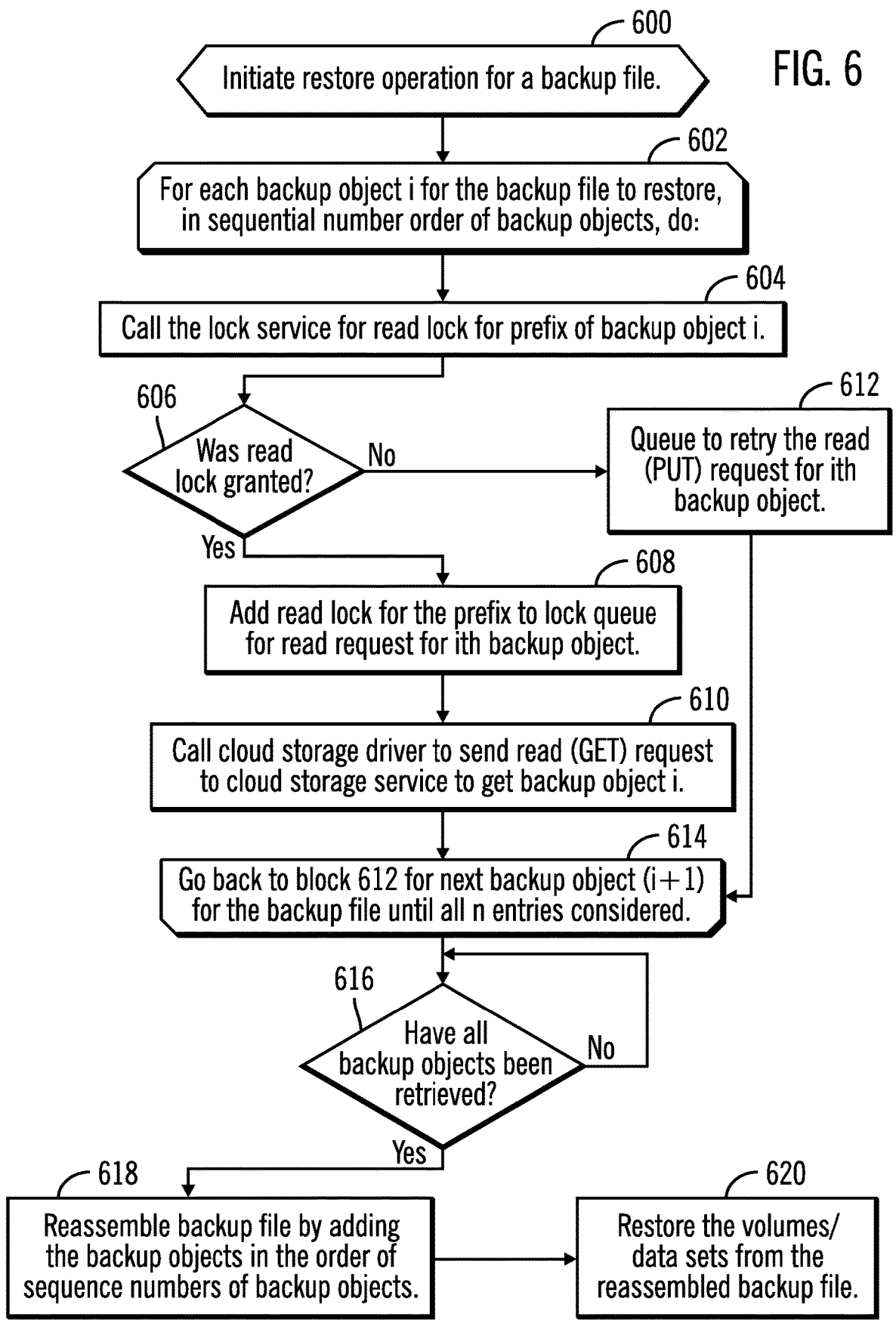
FIG. 6 illustrates an embodiment of operations to perform a restore of a backup file from a network storage.

FIG. 6 illustrates an embodiment of operations performed by the backup application 108 and cloud storage driver 114 to restore a backup file 200 from the backup objects $112_S$ for the backup file 200 in the network storage 116. Upon initiating (at block 600) a restore operation, the backup application 108 performs a loop of operations at block 602 through 614 for each backup object $112_i$ for the backup file 200 to restore in the sequence number order 306 of the backup objects $112_i$ for the backup file 304. The backup application 108 calls (at block 604) the lock service 130 for a read lock for the prefix 312 in the backup object information $300_i$ of the backup object $112_i$. If (at block 606) the read lock for the prefix 312 is granted, which occurs if there is no write lock for the lock prefix 312 in the lock queue 132, then a read lock for the prefix 312 is added (at block 608) to the lock queue 132 for the read request for the ith backup object $112_i$. The backup application 108 calls (at bock 610) the cloud storage driver 114 to send a read (GET) request to the cloud storage service 118 to retrieve the backup object $112_i$. The cloud storage driver 114 sends the GET request to the server storage interface 124 to process.

If (at block 606) the read lock is not granted, then a retry of the read request is queued (at block 612) to retry the read request for the backup object $112_i$, which is granted when any write lock for the prefix 312 of the backup object $112_i$ is released. After retrieving (at block 616) all the backup objects $112_i$ for the backup file 200, the backup application 108 reassembles (at block 618) the received backup objects $112_i$ in the order of sequence numbers 306 of backup objects $112_i$ into a reassembled backup file $200_R$. The volumes/data sets from the reassembled backup file $200_R$ may be restored (at block 620) in the client storage 104.

With the operations of FIG. 6, backup objects of a sequential backup file 200 may be concurrently read/downloaded from over the network 122 to reduce the network 122 transmission time of retrieving the backup file 200 from the cloud. Even if the backup objects are read out of order, with respect to the order of the records 202-212 in the backup file 200, the backup application 108 can use the sequence numbers 306 to determine the order in which the records contained in the read backup objects 112i are included in the reassembled backup file $200_R$.

Figure 7:
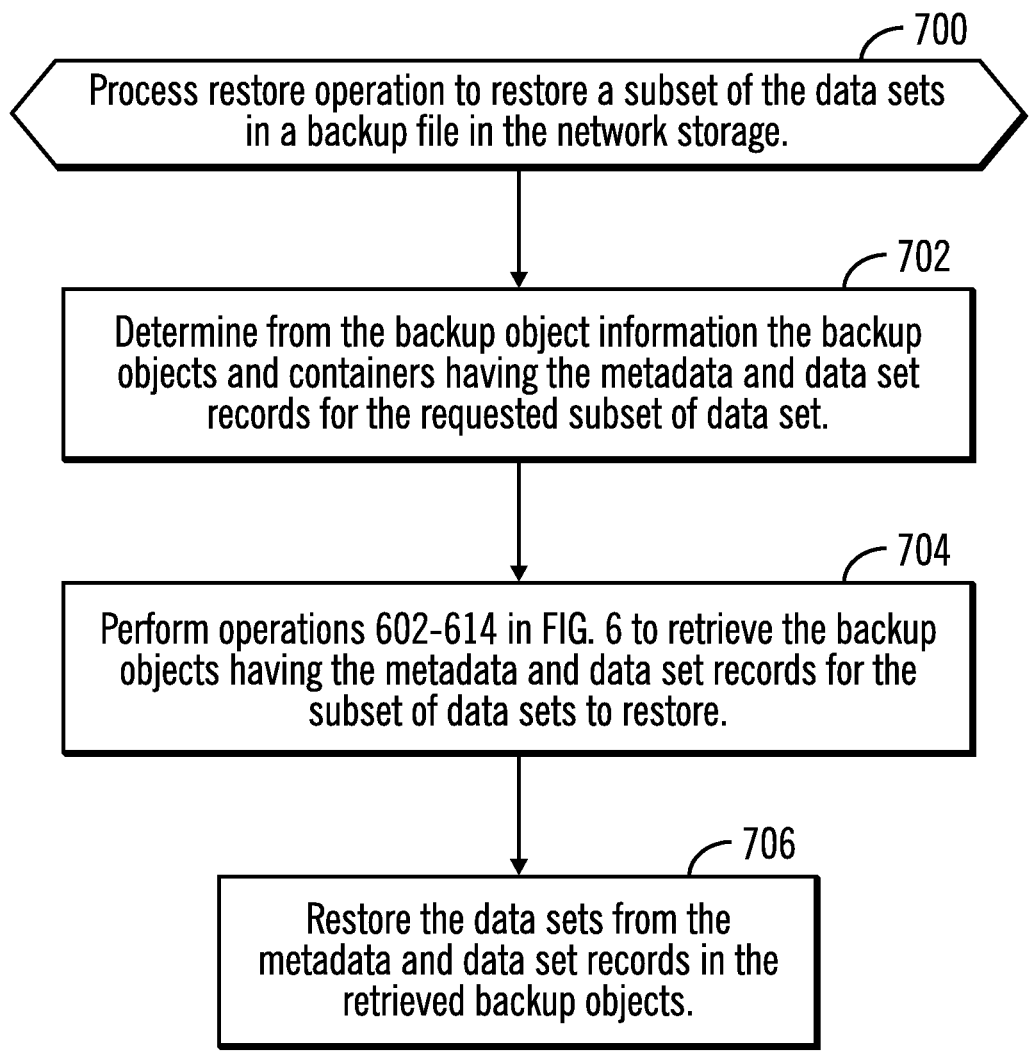
FIG. 7 illustrates an embodiment of operations to restore a subset of data sets from a backup file in a network storage.

FIG. 7 illustrates an embodiment of operations performed by the backup application 108 and cloud storage driver 114 to restore a subset of data sets 102 from a backup file 200. Upon processing (at block 700) a restore operation to restore a subset of the data sets 102 in a backup file 200 in the network storage 116, the backup application 108 determines (at block 702) from the backup object information the backup objects and containers having the metadata and data set records for the requested subset of data sets. The determination may be made from processing an inventory of the backup file 200 or other information on the records in the backup file 200. The backup application 108 then performs (at block 704) the operations at block 602-614 in FIG. 6 to retrieve the backup objects $112_S$ having the metadata and data set records 202-212 for the subset of data sets to restore. The subset of data sets are retrieved and restored (at block 706) to the client storage 104 from the metadata and data set records in the retrieved objects.

With the operations of FIG. 7, the backup application 108 may further expedite the restore process by only downloading backup objects for those subset of data sets to restore from the backup file 200. Further, by concurrently reading the backup objects $112_S$ for the subset of data sets, retrieval of the desired data objects is further optimized.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
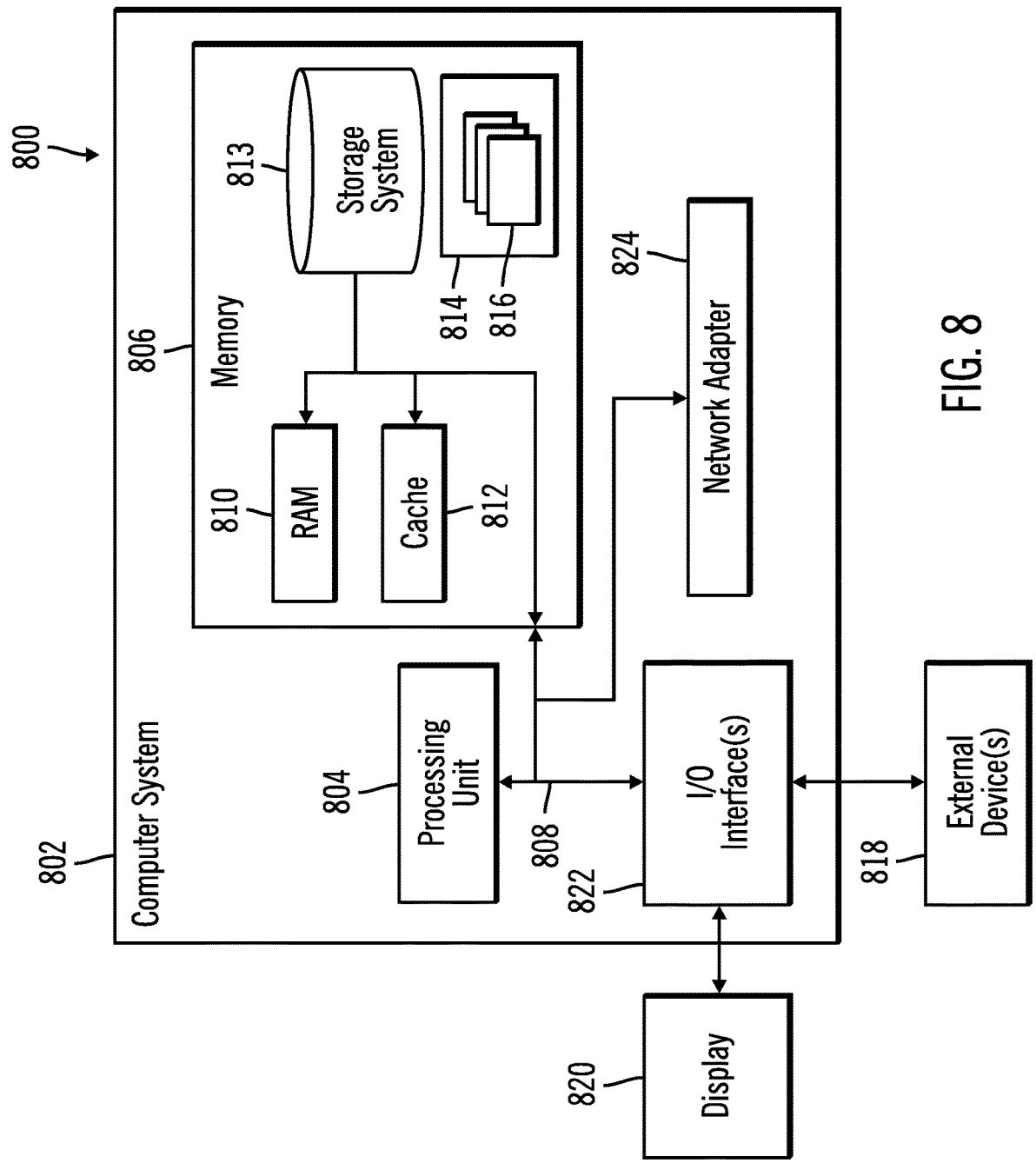
FIG. 8 depicts an embodiment of a cloud computing node.

Referring now to FIG. 8, a schematic of an example of a cloud computing node is shown, such as the client systems 100 and storage server 120, that implement a cloud based storage service. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus 808 that couples various system components including system memory 806 to processor 804.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 20. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
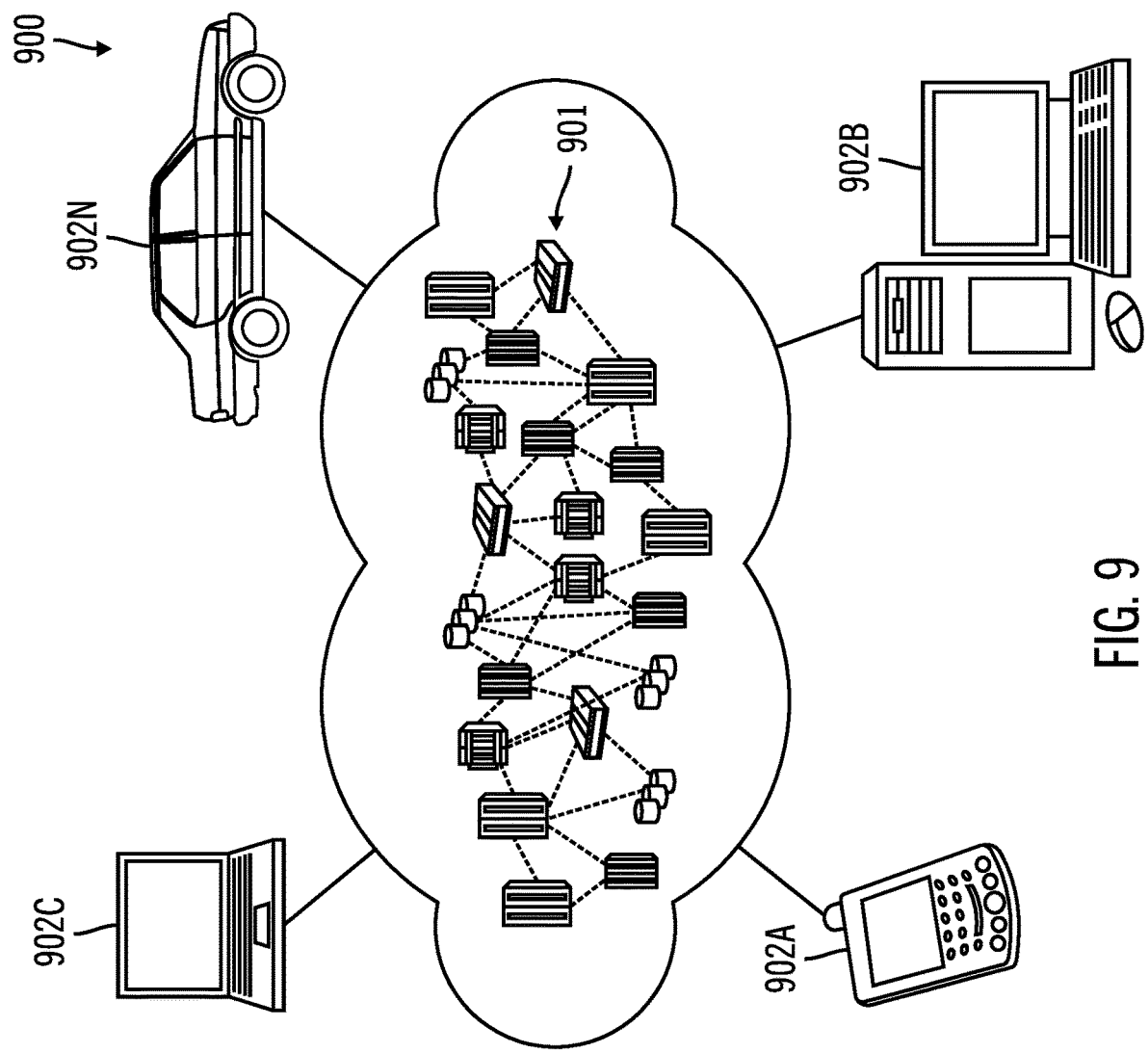
FIG. 9 depicts an embodiment of a cloud computing environment.

Referring now to FIG. 9, illustrative cloud computing environment 900 is depicted. As shown, cloud computing environment 900 comprises one or more cloud computing nodes 901 with which local computing devices used by cloud consumers, such as, for example, personal digital assistant (PDA) or cellular telephone 902A, desktop computer 902B, laptop computer 902C, and/or automobile computer system 902N may communicate. Nodes 901 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 902A-N shown in FIG. 9 are intended to be illustrative only and that computing nodes 901 and cloud computing environment 900 can communicate with any type of computerized device over any type of network and/or network addressable connection (e.g., using a web browser).

Figure 10:
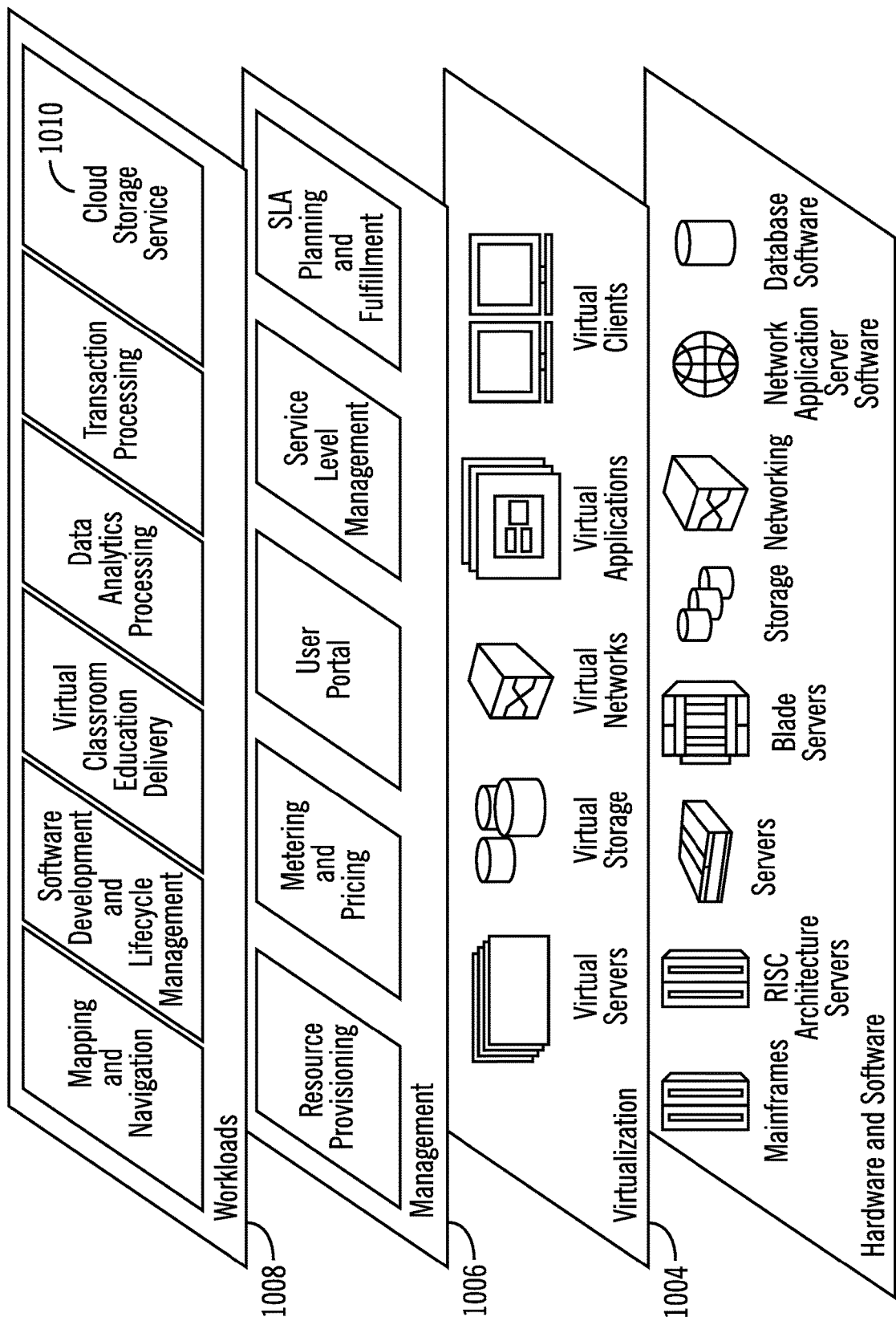
FIG. 10 depicts an embodiment of abstraction model layers of a cloud computing environment.

Referring now to FIG. 10, a set of functional abstraction layers provided by cloud computing environment 1000 (FIG. 10) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include: mainframes; RISC (Reduced Instruction Set Computer) architecture based servers; storage devices; networks and networking components. In some embodiments, software components include network application server software.

Virtualization layer 1004 provides an abstraction layer from which the following examples of virtual entities may be provided: virtual servers; virtual storage; virtual networks, including virtual private networks; virtual applications and operating systems; and virtual clients.

In one example, management layer 1006 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1008 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud based storage services 1010 as described above with respect to the cloud storage service 118 and cloud storage driver 114 described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for maintaining a backup file in in a network storage over a network, wherein the computer program product comprises a computer readable storage medium having computer readable program instructions executed by a processor to perform operations, the operations comprising:

processing a backup file comprising a sequential file of metadata records and data set records, wherein the metadata records include metadata on data of data sets in the data set records;

generating backup objects to store the metadata and the data set records in the backup file;

determining containers in the network storage to store the backup objects offered by at least one storage service;

generating backup object information indicating, for each backup object of the backup objects, an order of the data set records in the backup file, stored in the backup object, and a container name of a container in the network storage offered by one of the at least on storage service to store the backup object;

determining, from the backup object information for the backup objects, containers for the backup objects; and concurrently transmitting multiple of the backup objects to the network storage over the network to concurrently write to the containers determined from the backup object information for the backup objects being transmitted.

2. The computer program product of claim 1, wherein the backup objects are concurrently transmitted in the order indicated in the backup object information for the backup objects.

3. The computer program product of claim 1, wherein one backup object is generated for each separate metadata record and at least one backup object is created for each logical grouping of data in data sets.

4. The computer program product of claim 3, wherein the generating the backup object for one of the metadata records further comprises:

determining whether a metadata record is comprised of a plurality of sub-metadata records; and generating a backup object for each of the sub-metadata records to be stored in a container.

5. The computer program product of claim 1, wherein the metadata records for which backup objects are generated include characterizations of the data sets in the backup file including at least two of header records, list of data sets record, at least one volume record for each volume of the data sets in the backup file, at least one data set record for data in the at least one volume.

6. The computer program product of claim 1, wherein the operations further comprise:
  sending multiple read requests to concurrently read a plurality of the backup objects in the containers in the network storage;
  in response to receiving the read backup objects, determining, from the backup object information for the read backup objects, the order of the metadata and data set records in the received backup objects in the backup file; and
  generating a reassembled backup file comprising the metadata and data set records in the received backup objects in the determined order.

7. The computer program product of claim 6, wherein the operations further comprise:
  generating for each of the backup objects a lock prefix;
  requesting a read lock for the lock prefix for a backup object to read, wherein the read lock for the lock prefix is granted if there is no write lock for the lock prefix in a lock queue; and
  adding the read lock for the lock prefix to the lock queue in response to receiving the read lock for the lock prefix, wherein a read request for the backup object is transmitted to the network storage in response to receiving the read lock for the lock prefix of the backup object.

8. The computer program product of claim 1, wherein the operations further comprise:
  generating for each of the backup objects a lock prefix;
  requesting a write lock for the lock prefix of a backup object to write to the network storage; and
  adding a write lock for the lock prefix for the backup object to write to a lock queue, wherein the backup object is written in response to granting the write lock for the lock prefix of the backup object, wherein the write lock for the lock prefix in the lock queue prevents read or write requests directed to the backup object while the write lock for the lock prefix is in the lock queue.

9. The computer program product of claim 1, wherein the backup objects for the metadata records comprise inventory objects having information on attributes of data sets in at least one of the backup objects.

10. The computer program product of claim 1, wherein the operations further comprise:
  receiving a restore request to restore a subset of the data sets in the backup file transmitted to the network storage;
  determining the backup objects having the subset of the data sets and the metadata records for the subset of the data sets;
  sending multiple read requests to concurrently read a plurality of the determined backup objects in the containers in the network storage; and
  restoring data sets at a client system from the read backup objects.

11. A system for maintaining a backup file in a network storage over a network, comprising:
  processor; and
  a computer readable storage medium having computer readable program instructions executed by the processor to perform operations, the operations comprising:
    processing a backup file comprising a sequential file of metadata records and data set records, wherein the metadata records include metadata on data of data sets in the data set records;
    generating backup objects to store the metadata and the data set records in the backup file;
    determining containers in the network storage to store the backup objects offered by at least one storage service;
    generating backup object information indicating, for each backup object of the backup objects, an order of data set records in the backup file, stored in the backup object, and a container name of a container in the network storage offered by one of the at least on storage service to store the backup object;
    determining, from the backup object information for the backup objects, containers for the backup objects; and
    concurrently transmitting multiple of the backup objects to the network storage over the network to concurrently write to the containers determined from the backup object information for the backup objects being transmitted.

12. The system of claim 11, wherein one backup object is generated for each separate metadata record and at least one backup object is created for each logical grouping of data in data sets.

13. The system of claim 11, wherein the operations further comprise:
  sending multiple read requests to concurrently read a plurality of the backup objects in the containers in the network storage;
  in response to receiving the read backup objects, determining, from the backup object information for the read backup objects, the order of the metadata and data set records in the received backup objects in the backup file; and
  generating a reassembled backup file comprising the metadata and data set records in the received backup objects in the determined order.

14. The system of claim 13, wherein the operations further comprise:
  generating for each of the backup objects a lock prefix;
  requesting a read lock for the lock prefix for a backup object to read, wherein the read lock for the lock prefix is granted if there is no write lock for the lock prefix in a lock queue; and
  adding the read lock for the lock prefix to the lock queue in response to receiving the read lock for the lock prefix, wherein a read request for the backup object is transmitted to the network storage in response to receiving the read lock for the lock prefix of the backup object.

15. The system of claim 11, wherein the operations further comprise:
  generating for each of the backup objects a lock prefix;
  requesting a write lock for the lock prefix of a backup object to write to the network storage; and
  adding a write lock for the lock prefix for the backup object to write to a lock queue, wherein the backup object is written in response to granting the write lock for the lock prefix of the backup object, wherein the write lock for the lock prefix in the lock queue prevents read or write requests directed to the backup object while the write lock for the lock prefix is in the lock queue.

16. The system of claim 11, wherein the operations further comprise:
  receiving a restore request to restore a subset of the data sets in the backup file transmitted to the network storage;

determining the backup objects having the subset of the data sets and the metadata records for the subset of the data sets;

sending multiple read requests to concurrently read a plurality of the determined backup objects in the at least one of the containers in the network storage; and restoring data sets at a client system from the read backup objects.

17. A method for maintaining a backup file in a network storage over a network, comprising:

processing a backup file comprising a sequential file of metadata records and data set records, wherein the metadata records include metadata on data of data sets in the data set records;

generating backup objects to store the metadata and the data set records in the backup file;

determining containers in the network storage to store the backup objects offered by at least one storage service;

generating backup object information indicating, for each backup object of the backup objects, an order of the data set records in the backup file, stored in the backup object, and a container name of a container in the network storage offered by one of the at least on storage service to store the backup object is stored;

determining, from the backup object information for the backup objects, containers for the backup objects; and concurrently transmitting multiple of the backup objects to the network storage over the network to concurrently write to the containers determined from the backup object information for the backup objects being transmitted.

18. The method of claim 17, wherein one backup object is generated for each separate metadata record and at least one backup object is created for each logical grouping of data in data sets.

19. The method of claim 17, further comprising:

sending multiple read requests to concurrently read a plurality of the backup objects in the containers in the network storage;

in response to receiving the read backup objects, determining, from the backup object information for the read backup objects, the order of the metadata and data set records in the received backup objects in the backup file; and generating a reassembled backup file comprising the metadata and data set records in the received backup objects in the determined order.

20. The method of claim 19, further comprising:

generating for each of the backup objects a lock prefix;

requesting a read lock for the lock prefix for a backup object to read, wherein the read lock for the lock prefix is granted if there is no write lock for the lock prefix in a lock queue; and adding the read lock for the lock prefix to the lock queue in response to receiving the read lock for the lock prefix, wherein a read request for the backup object is transmitted to the network storage in response to receiving the read lock for the lock prefix of the backup object.

21. The method of claim 17, further comprising:

generating for each of the backup objects a lock prefix;

requesting a write lock for the lock prefix of a backup object to write to the network storage; and adding a write lock for the lock prefix for the backup object to write to a lock queue, wherein the backup object is written in response to granting the write lock for the lock prefix of the backup object, wherein the write lock for the lock prefix in the lock queue prevents read or write requests directed to the backup object while the write lock for the lock prefix is in the lock queue.

22. The method of claim 17, further comprising:

receiving a restore request to restore a subset of the data sets in the backup file transmitted to the network storage;

determining the backup objects having the subset of the data sets and the metadata records for the subset of the data sets;

sending multiple read to concurrently read a plurality of the determined backup objects in the containers in the network storage; and restoring data sets at a client system from the read backup objects.

* * * * *